United States Patent [19]

Blurton et al.

[11] 4,220,690
[45] Sep. 2, 1980

[54] SECONDARY ZINC/OXYGEN ELECTROCHEMICAL CELLS USING INORGANIC OXYACID ELECTROLYTES

[75] Inventors: Keith F. Blurton, Hinsdale; Anthony F. Sammells, Naperville, both of Ill.

[73] Assignee: Institute of Gas Technology, Chicago, Ill.

[21] Appl. No.: 52,970

[22] Filed: Jun. 28, 1979

[51] Int. Cl.² .......................................... H01M 8/04
[52] U.S. Cl. ....................................... 429/15; 429/29; 429/229
[58] Field of Search ....................... 429/14, 15, 27–29, 429/229; 320/2

[56] References Cited

U.S. PATENT DOCUMENTS

| | | | |
|---|---|---|---|
| 3,446,675 | 5/1969 | Jost | 429/27 X |
| 3,825,445 | 7/1974 | MacCarthy | 429/15 |
| 3,944,430 | 3/1976 | Lee | 429/229 X |
| 3,969,144 | 7/1976 | Zaromb | 429/14 |
| 4,096,318 | 6/1978 | Wurmb et al. | 429/229 X |
| 4,104,449 | 8/1978 | Böhnstedt | 429/229 X |

*Primary Examiner*—Charles F. Lefevour
*Attorney, Agent, or Firm*—Thomas W. Speckman

[57] ABSTRACT

A secondary zinc/oxygen electrochemical cell utilizing a circulating aqueous inorganic oxyacid electrolyte and having an external load circuit or charging circuit in electronic communication with the anode and cathode, the circuit being completed by ionic interaction through an ionic separator between the catholyte and anolyte. The electrochemical cell of this invention provides a process for production of electricity and may be recharged by providing electrical energy from the external circuit.

33 Claims, 1 Drawing Figure

U.S. Patent
Sep. 2, 1980
4,220,690
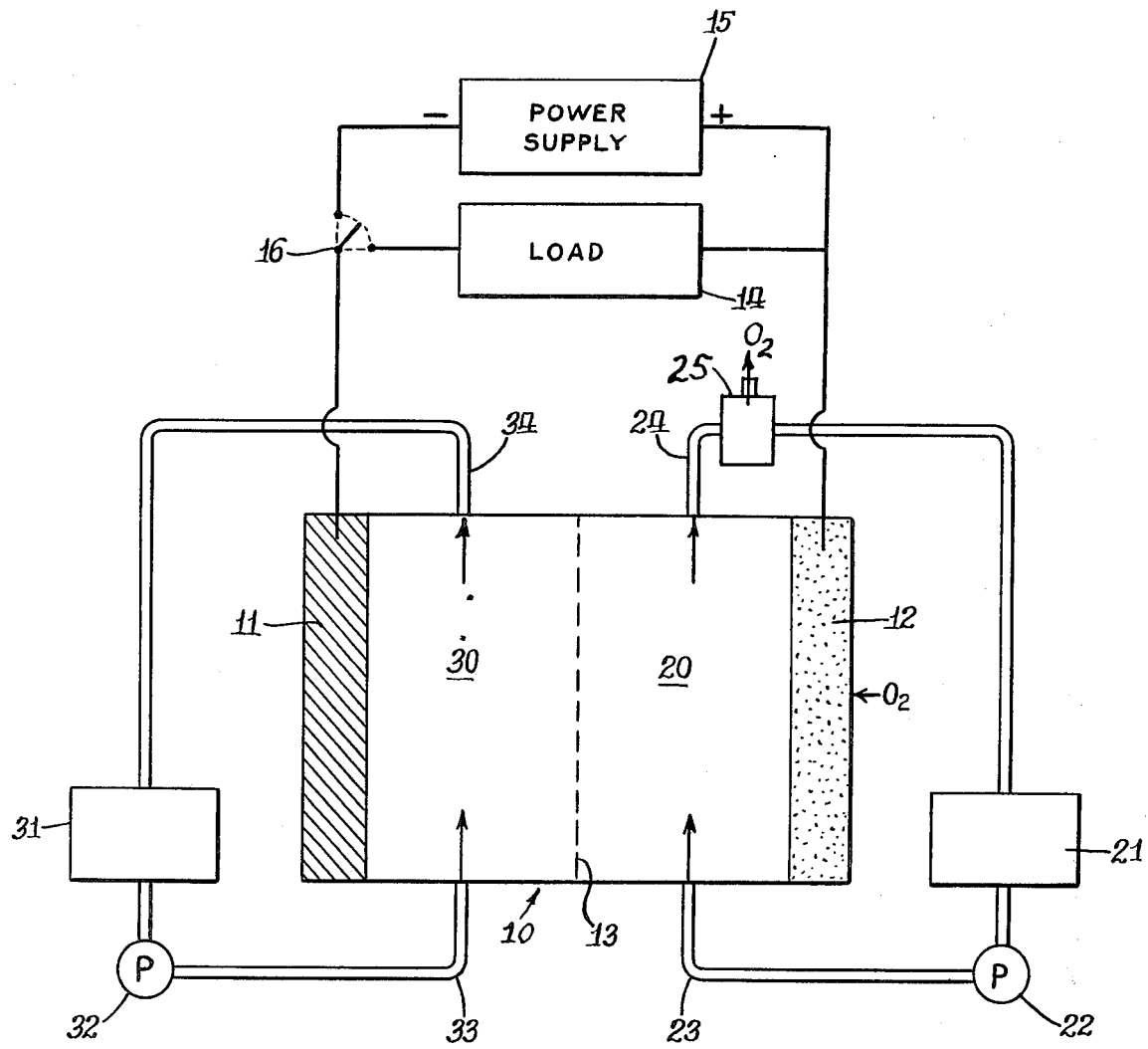

SECONDARY ZINC/OXYGEN ELECTROCHEMICAL CELLS USING INORGANIC OXYACID ELECTROLYTES

BACKGROUND OF THE INVENTION

1. Field of the Invention

This invention relates to a secondary zinc/oxygen electrochemical cell having an aqueous inorganic oxyacid electrolyte wherein the catholyte and anolyte compartments are separated by an ionically conducting separator. An external load circuit or charging circuit is in electronic communication between the anode and the cathode, the circuit being completed by providing ionic interaction between the two electrolytes. The electrochemical cell is operated at acid pH's providing higher open circuit voltage and consequently higher energy densities resulting in more efficient utilization of zinc than prior electrochemical cells having basic electrolytes. Further, use of the oxyacid electrolyte avoids dendrite formation and carbon dioxide adsorption problems experienced with prior electrochemical cells utilizing basic electrolytes. Use of the catalyzed oxygen cathode in the zinc/oxygen inorganic oxyacid electrolyte electrochemical cell of this invention overcomes the need for oxidant storage as in the case of previously used halogen acids.

2. Description of the Prior Art

Secondary zinc/oxygen electrochemical cells having alkaline electrolytes are known in the prior art. One severe difficulty of alkaline zinc/oxygen electrochemical cells has been electrodeposition of the zinc metal in the recharge cycle resulting in dendrite formation and zinc electrode shape change which results in decreased capacity for electrochemical conversion with repeated recharge cycles. Various techniques have been proposed for reducing the effects of dendritic growth on the anode surface including mechanical movement of the anode such as taught by U.S. Pat. Nos. 3,716,413; 3,560,261 and 3,440,098. Another method to improve electrical recharging of such electrochemical cells is by adding complexing agents to the electrolyte to increase solubility of the zinc in the electrolyte and to improve the quality of the plating such as taught by U.S. Pat. No. 3,540,935. Another approach to the maintenance of efficient zinc anode surface is to mechanically abrade the anode surface together with agitation of the alkaline electrolyte as taught by U.S. Pat. No. 3,822,149.

Use of acidic aqueous electrolytes has been suggested in electrochemical cells having a very large anode, by comparison with the cathode, and it has been taught by U.S. Pat. No. 3,446,675 that zinc is not suitable for use as such as anode material. Use of acid electrolytes has also been known in primary or non-reversible electrochemical cells such as taught by U.S. Pat. No. 3,825,445. Rechargeable galvanic cells utilizing zinc anodes and a zinc-containing electrolyte comprising an aqueous acid and containing a quaternary ammonium compound for suppression of formation of dendrites on the anode during charging is taught by U.S. Pat. No. 3,944,430.

Mechanically rechargeable battery systems using zinc/air systems, due to their relatively high energy density and potentially low cost, have been developed for high-rate military uses and low-rate primary batteries for commercial applications, such as hearing aids and watches.

Zinc/halogen electrochemical cells have been developed, but they require oxidant storage. The secondary zinc/oxygen electrochemical cell of the present invention does not require oxidant storage.

SUMMARY OF THE INVENTION

The present invention provides a process and apparatus for a secondary zinc/oxygen electrochemical cell. The secondary zinc/oxygen electrochemical cell of this invention has a catholyte and anolyte compartment separated by an ionically conducting separator and uses an aqueous inorganic oxyacid electrolyte. A zinc anode is in contact with a circulating electrolyte on on one side of the ionically conducting separator while a catalyzed oxygen cathode is in contact with circulating electrolyte on the other side of the ionically conducting separator. An external load circuit or charging circuit is in electronic communication with the anode and cathode with switching means for desired mode of operation. The electronic circuit is completed by ionic interaction between the electrolyte compartments through the ionic separator and electrons through the external load circuit or charging circuit. The electrolyte in contact with both electrodes should be maintained in a circulating condition to continuously provide desired ions to the electrode surfaces or to remove reaction products from the electrode surfaces. A process for production of electricity and a process for recharging the secondary zinc/oxygen electrochemical cell of this invention is provided.

The zinc/oxygen electrochemical cell of this invention provides long cycle life when the battery is periodically completely discharged. High energy densities may be achieved, Theoretical Energy Density being 740 Wh/lb., and high theoretical cell voltages, Theoretical Open Circuit Voltage being 1.99 volts.

It is an object of this invention to overcome many disadvantages of prior art processes for production of electricity.

It is another object of this invention to provide highly efficient utilization of zinc anode material and to provide more uniform zinc deposition during recharge cycles to avoid dendrite formation which has been a major disadvantage of prior processes.

It is yet another object of this invention to provide an electrochemical cell in which $CO_2$ will not be formed and subsequently absorbed by the electrolyte.

It is yet another object of this invention to provide a secondary zinc/oxygen electrochemical cell having an aqueous inorganic oxyacid electrolyte providing higher open circuit voltages than prior zinc/oxygen electrochemical cells having basic electrolytes.

BRIEF DESCRIPTION OF THE DRAWING

The objects, advantages and features of this invention will be apparent from the description together with the drawing showing one preferred embodiment wherein:

The FIGURE is a schematic representation of the secondary zinc/oxygen electrochemical cell of this invention.

DESCRIPTION OF THE PREFERRED EMBODIMENTS

Referring to the FIGURE, the secondary zinc/oxygen electrochemical cell is shown as 10 with the cell container divided into two compartments by ionically conducting separator 13. Zinc anode 11 is in contact with electrolyte in first compartment 30 containing the anolyte portion of the electrolyte. Second compartment 20 contains the catholyte portion of the electrolyte on the opposite side of ionically conducting separator 13 from compartment 30. Catalyzed oxygen cathode 12 is in contact with circulating electrolyte in second compartment 20. An external circuit containing either load 14 or power supply 15 for charging is in electronic communication with anode 11 and cathode 12. Selection between the load circuit and the charging circuit is provided by switching means 16.

Electrolyte is withdrawn from second compartment 20 by catholyte withdrawal conduit 24 leading to catholyte storage means 21. Oxygen vent is provided in conduit 24 by gas/liquid separator means 25 to remove oxygen from the catholyte. Catholyte inlet conduit is provided between catholyte storage means 21 and second compartment 20 with pump 22 to provide desired circulation of the electrolyte and supply of the electrolyte from catholyte storage means 21. Circulation of the catholyte provides protons in contact with the oxygen cathode during withdrawal of electricity, oxygen removal from the cathode surface during recharging and provides thermal control of the electrochemical cell.

Likewise, anolyte withdrawal conduit 34 is provided to transport anolyte from first compartment 30 to anolyte storage means 31. Anolyte inlet conduit 33 is provided from anolyte storage means 31 to first compartment 30 with pump 32 to provide circulation and supply of the anolyte portion of the electrolyte. Circulation of the anolyte portion of the electrolyte provides removal of zinc sulfate from the anode area during withdrawal of electricity, provides zinc ions in contact with the anode during recharging and provides thermal control of the electrochemical cell.

Catholyte storage means 21 and anolyte storage means 31 may be constructed of any material inert to the electrolyte and of suitable shape and size to provide desired electrolyte storage for the particular cell.

The cell container may be of any suitable configuration or material known to the art to achieve desired electrochemical configuration and activity of the cell. Ionically conducting separator 13 affords ionic interaction between the two electrolytes for completion of the electrical circuit. Suitable ionically conducting separator materials are well known in the art and include nitrocellulose, cellulose acetate, Nafion (a sulfonated perfluoropolyethylene sold by DuPont), and other fluorocarbon ion exchange membranes.

Suitable oxygen diffusion cathodes are known to the art, such as catalyst-containing teflon bonded air diffusion cathodes. A preferred catalyst for air cathodes, the catalyst site for oxygen reduction in the discharge mode, is high surface area, about 100 m$^2$/gm, platinum supported on carbon or graphite. This catalyst provides a low electrode polarization, on a unit weight basis, about 350 mV at a current density of 40 mA/cm$^2$ based upon an exchange current density of $10^{-10}$A/cm$^2$ at 25° C. and a Tafel slope of 60 mV/decade. At low charge rates the same catalyst sites may be used for oxygen reduction and evolution. To reduce corrosion at higher charge rates, graphite may be used as the catalyst support. Bifunctional oxygen diffusion cathodes may be used, for example, a plated platinum screen on the electrolyte side to provide a catalytic site for oxygen evolution.

When the terminology "oxygen" is used in this disclosure and claims, it is understood that a wide number of gases containing substantial portions of oxygen, such as air, are satisfactory for use with the oxygen diffusion cathodes in the cells of this invention. The only requirement is that sufficient oxygen be supplied for reduction without associated gases reacting in an adverse manner with the electrodes or electrolyte.

Zinc anode 11 may be in any form desired such as fabricated from a sheet of zinc or by plating zinc on a substrate rather than the requirement of use of zinc powder as previously required. The zinc anode for use in the electrochemical cell of this invention may be separately and inexpensively fabricated since the cell may be fabricated in the discharged state.

The electrolyte used in the zinc/oxygen electrochemical cell of this invention is an aqueous inorganic oxyacid electrolyte preferably selected from the group consisting of sulfuric, phosphoric, boric acids and mixtures thereof. Sulfuric acid is particularly preferred. Mixtures of sulfuric acid and phosphoric acid may be advantageously used to obtain a buffering effect. As pointed out above, the electrolyte is circulated to provide reactants to the electrode surface or to remove reaction products from the electrode surface area as well as for thermal control of the cell. Circulation of the electrolyte is necessary to provide compact cell size with short distances for ion travel, thus increasing both the charge and discharge efficiency of the cell. Electrolyte circulation providing apparent linear velocity in the electrode area of about 1 to about 10 cm/sec is suitable, about 1 to about 3 being preferred. The electrolyte should be maintained at a pH of about 0.5 to about 6.0, preferably from about 0.5 to about 4.0. It is particularly preferred that the pH of the anolyte portion of the electrolyte be maintained at about 1.0 to 4.0 and the pH of the catholyte portion of the electrolyte maintained at about 0.5 to 3.0 for most efficient operation. Inorganic buffering agents may be used to assist in maintenance of these pH's.

An exemplary secondary zinc/oxygen electrochemical cell of this invention using an aqueous sulfuric acid electrolyte exhibits the following overall reactions upon production of electricity:

Anolyte:

$$Zn + SO_4^{2-} \rightarrow ZnSO_4 + 2e^-$$

Catholyte:

$$O_2 + 4H^+ + 2e^- \rightarrow 2H_2O$$

It is seen by the above chemical representations that electricity may be produced by the secondary zinc/oxygen electrochemical cell of this invention by contacting the zinc anode with an aqueous inorganic oxyacid anolyte causing oxidation of the zinc anode while contacting a catalyzed oxygen cathode with oxygen and aqueous inorganic oxyacid catholyte causing reduction of the oxygen to form water. The produced electrical energy is withdrawn from the cell by loading an external circuit which is in electronic communication with the anode and cathode while completing the electrical circuit by ionic interaction between the anolyte and catholyte through the ionically conducting separator.

The secondary zinc/oxygen electrochemical cell of this invention may be recharged by provision of a power supply in the external circuit furnishing electrons to the zinc anode causing chemical reactions reverse of those involved in electricity production. The zinc anode is contacted with aqueous inorganic oxyacid anolyte transporting zinc salts of the inorganic oxyacid anolyte to provide zinc ions for addition to the anode. The catalyzed oxygen cathode is contacted with flowing aqueous inorganic oxyacid catholyte producing oxygen which is vented from the system. The electrical circuit is completed by ionic interaction between the anolyte and catholyte through the ionically conducting separator.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A secondary zinc/oxygen electrochemical cell comprising a cell container divided into a first and second electrolyte compartment by an ionically conducting separator; an aqueous inorganic oxyacid electrolyte in each of said compartments, a zinc anode in contact with circulating electrolyte in said first compartment, a catalyzed oxygen cathode in contact with circulating electrolyte in said second compartment, means for circulating said electrolyte in said first and second compartments, and an external load circuit or charging circuit in electronic communication with said anode and said cathode, the circuit being completed by ionic interaction between electrolyte compartments through said ionic separator and electrons through the external load circuit or charging circuit.

2. The electrochemical cell of claim 1 wherein said inorganic oxyacid electrolyte is maintained at a pH of about 0.5 to about 6.0.

3. The electrochemical cell of claim 1 wherein said inorganic oxyacid electrolyte is maintained at a pH of about 0.5 to about 4.0.

4. The electrochemical cell of claim 1 wherein said inorganic oxyacid is selected from the group consisting of sulfuric, phosphoric, boric acids and mixtures thereof.

5. The electrochemical cell of claim 1 wherein said inorganic oxyacid is sulfuric acid.

6. The electrochemical cell of claim 1 wherein said inorganic oxyacid is a mixture of sulfuric and phosphoric acids.

7. The electrochemical cell of claim 1 wherein said electrolyte is circulated in the electrode area at an apparent linear velocity of about 1 to about 10 cm/sec.

8. The electrochemical cell of claim 7 wherein said velocity is about 1 to about 3 cm/sec.

9. The electrochemical cell of claim 1 wherein the pH of electrolyte in said first compartment is about 1.0 to about 4.0 and the pH of electrolyte in said second compartment is about 0.5 to about 3.0.

10. The electrochemical cell of claim 1 wherein said catalyzed oxygen cathode is high surface area platinum supported on graphite.

11. The electrochemical cell of claim 1 wherein said electrolyte is circulated from said first and second compartments to separate respective storage means for recycling to said respective compartments.

12. A process for production of electricity by use of a secondary zinc/oxygen electrochemical cell having an aqueous inorganic oxyacid electrolyte comprising:

contacting a zinc anode with a flowing aqueous inorganic oxyacid anolyte causing oxidation of the zinc anode;

contacting a catalyzed oxygen cathode with oxygen and a flowing aqueous inorganic oxyacid catholyte causing reduction of oxygen to form water;

withdrawing electrical energy from said cell by loading an external circuit in electronic communication with said anode and cathode; and completing the electrical circuit by contacting one side of an ionically conducting separator with said anolyte and the other side with said catholyte, providing ionic interaction between the two electrolytes.

13. The process of claim 12 wherein said inorganic oxyacid electrolyte is maintained at a pH of about 0.5 to about 6.0.

14. The process of claim 12 wherein said inorganic oxyacid electrolyte is maintained at a pH of about 0.5 to about 4.0.

15. The process of claim 12 wherein said inorganic oxyacid is selected from the group consisting of sulfuric, phosphoric, boric acids and mixtures thereof.

16. The process of claim 12 wherein said inorganic oxyacid is sulfuric acid.

17. The process of claim 12 wherein said inorganic oxyacid is a mixture of sulfuric and phosphoric acids.

18. The process of claim 12 wherein said electrolyte is circulated in the electrode area at an apparent linear velocity of about 1 to about 10 cm/sec.

19. The process of claim 12 wherein said velocity is about 1 to about 3 cm/sec.

20. The process of claim 12 wherein the pH of said anolyte is about 1.0 to about 4.0 and the pH of said catholyte is about 0.5 to about 3.0.

21. The process of claim 12 wherein said catalyzed oxygen cathode is high surface area platinum supported on graphite.

22. The process of claim 12 wherein said anolyte and catholyte are circulated to separate respective storage means for recycle.

23. A process for recharging a secondary zinc/oxygen electrochemical cell having an aqueous inorganic oxyacid electrolyte comprising:

providing electrical energy from an external circuit to a zinc anode and a catalyzed oxygen cathode;

contacting said zinc anode with a flowing aqueous inorganic oxyacid anolyte transporting zinc salts of said inorganic oxyacid anolyte to add zinc to said anode;

contacting said catalyzed oxygen cathode with flowing aqueous inorganic oxyacid catholyte to produce oxygen and venting said oxygen; and completing the electrical circuit by contacting one side of an ionically conducting separator with said anolyte and the other side with said catholyte, providing ionic interaction between the two electrolytes.

24. The process of claim 23 wherein said inorganic oxyacid electrolyte is maintained at a pH of about 0.5 to about 6.0.

25. The process of claim 23 wherein said inorganic oxyacid electrolyte is maintained at a pH of about 0.5 to about 4.0.

26. The process of claim 23 wherein said inorganic oxyacid is selected from the group consisting of sulfuric, phosphoric, boric acids and mixtures thereof.

27. The process of claim 23 wherein said inorganic oxyacid is sulfuric acid.

28. The process of claim 23 wherein said inorganic oxyacid is a mixture of sulfuric and phosphoric acids.

29. The process of claim 23 wherein said electrolyte is circulated in the electrode area at an apparent linear velocity of about 1 to about 10 cm/sec.

30. The process of claim 23 wherein said velocity is about 1 to about 3 cm/sec.

31. The process of claim 23 wherein the pH of said anolyte is about 1.0 to about 4.0 and the pH of said catholyte is about 0.5 to about 3.0.

32. The process of claim 23 wherein said catalyzed oxygen cathode is high surface area platinum supported on graphite.

33. The process of claim 23 wherein said anolyte and catholyte are circulated to separate respective storage means for recycle.

* * * * *